(12) United States Patent
Ku et al.

(10) Patent No.: US 8,045,793 B2
(45) Date of Patent: Oct. 25, 2011

(54) STEREO MATCHING SYSTEM AND STEREO MATCHING METHOD USING THE SAME

(75) Inventors: Ja-Seung Ku, Suwon-si (KR); Hui Nam, Suwon-si (KR); Chan-Young Park, Suwon-si (KR); Beom-Shik Kim, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 843 days.

(21) Appl. No.: 12/110,161

(22) Filed: Apr. 25, 2008

(65) Prior Publication Data

US 2009/0041336 A1   Feb. 12, 2009

(30) Foreign Application Priority Data

Aug. 6, 2007   (KR) .................. 10-2007-0078562

(51) Int. Cl.
  *G06K 9/00* (2006.01)
  *G06K 9/48* (2006.01)
(52) U.S. Cl. ....................... 382/154; 382/199
(58) Field of Classification Search .......... 382/154, 382/199
  See application file for complete search history.

(56) References Cited

U.S. PATENT DOCUMENTS

| 7,570,804 | B2 * | 8/2009 | Kim et al. ........ | 382/154 |
| 7,711,181 | B2 * | 5/2010 | Kee et al. ........ | 382/154 |
| 2004/0240725 | A1 * | 12/2004 | Xu et al. ........ | 382/154 |

FOREIGN PATENT DOCUMENTS

| JP | 2003-248814 | 9/2003 |
| KR | 10-2004-0006738 | 1/2004 |
| KR | 10-2004-0058421 | 7/2004 |
| KR | 10-2005-0121080 | 12/2005 |
| KR | 10-2006-0115237 | 11/2006 |
| KR | 10-2007-0061094 | 6/2007 |

OTHER PUBLICATIONS

Brown et al. "Advances in Computational Stereo" IEEE Transactions on Pattern Analysis and Machine Intelligence vol. 25, No. 8, Aug. 2003.*
Patent Abstracts of Japan, Publication No. 2003-248814; Date of Publication: Sep. 23, 2003; in the name of Yoshihiro Kawai, et al.
Korean Patent Abstracts, Publication No. 1020040006738 A; Date of Publication: Jan. 24, 2004; in the name of Han Sung Kim, et al.
Korean Patent Abstracts, Publication No. 1020050121080 A; Date of Publication: Dec. 26, 2005; in the name of Myung Ryul Choi, et al.
Korean Patent Abstracts, Publication No. 1020060115237 A; Date of Publication: Nov. 8, 2006; in the name of Mun Ho Jeong, et al.
Ku, Ja Seung et al., "28.3: Dense Disparity Map Calculation from Color Stereo Images Using Edge Information"; Society for Information Display, 2007 International Symposium, Digest of Technical Papers, vol. XXXVIII, Book II; Long Beach Convention Center, May 23-25, 2007; pp. 1160-1163.
Korean Patent Registration Gazette dated May 19, 2009, for priority Korean application 10-2007-0078562, noting listed references in this IDS, as well as KR 10-2004-0006738, previously filed in an IDS dated Apr. 25, 2008.

* cited by examiner

*Primary Examiner* — Bhavesh Mehta
*Assistant Examiner* — Utpal Shah
(74) *Attorney, Agent, or Firm* — Christie, Parker & Hale, LLP

(57) ABSTRACT

A stereo matching system and a stereo matching method using the same. Here, a Sum of Edge Differences (SED) method as a disparity estimation method utilizing edge information is added to a disparity estimation method utilizing a local method to perform stereo matching. As such, it is possible to correct false matching in a non-texture region generated when stereo matching is performed using only a local method, thereby enabling good stereo matching.

20 Claims, 9 Drawing Sheets

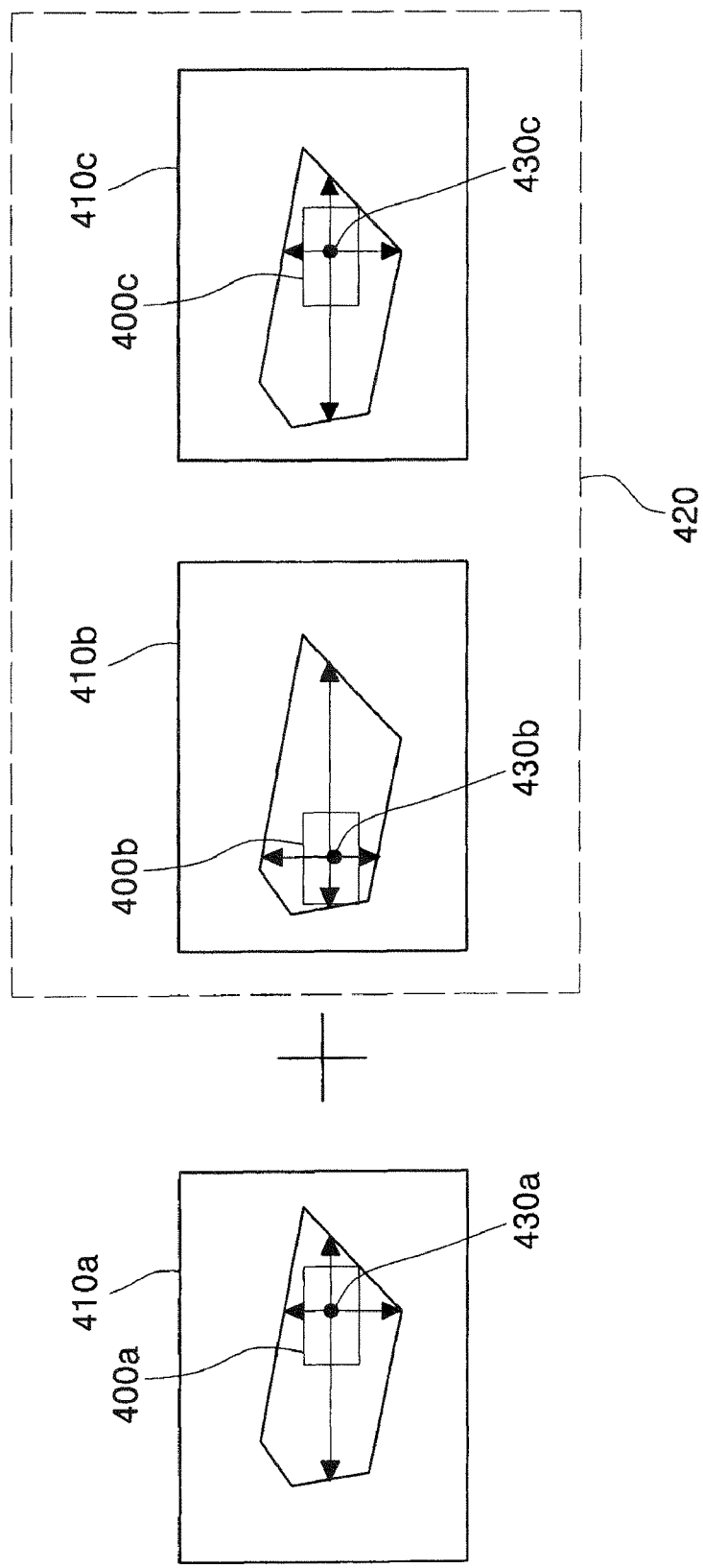

STEREO MATCHING SYSTEM AND STEREO MATCHING METHOD USING THE SAME

CROSS-REFERENCE TO RELATED APPLICATION

This application claims priority to and the benefit of Korean Patent Application No. 10-2007-0078562, filed Aug. 6, 2007, the entire content of which is incorporated herein by reference.

BACKGROUND OF THE INVENTION

1. Field of the Invention

The present invention relates to a stereo matching system and a stereo matching method using the same.

2. Description of the Related Art

In general, stereo matching refers to estimating disparity as a distance between corresponding points of two images that are obtained by different view points using distance perception ability in a human visual system, and to obtaining a precise and reliable disparity map.

In addition, the disparity map is implemented as a depth map to recover a three-dimensional image for providing depth perception.

Stereo matching may be used in various fields, such as information communication, broadcasting, medicine, games, displays, and so on, which may be referred to as core technology of three-dimensional multimedia.

Stereo matching generally uses a local method. The local method sets a certain block region around a reference pixel of a left image as a reference image among input left and right images.

Then, the stereo matching method finds a region in the right image most closely corresponding to the certain block region around the reference pixel of the left image, to thereby estimate disparity and obtain the disparity map.

The local method includes a Sum of Squared Differences (SSD) method for obtaining a correlation between blocks of certain regions of the left and right images using light and shade information and summing squared differences, a Sum of Absolute Differences (SAD) method for obtaining a correlation between the blocks and summing absolute differences, and a normalized cross coefficient method using (or utilizing) correlation between pixels.

The local method can be performed well as the stereo matching when light and shade differences are clear.

However, since the local method uses the light and shade information only, it is difficult to precisely find similar images in a non-texture region, thereby causing false matching.

FIG. 1 is a view for explaining false matching in a non-texture region.

Referring to FIG. 1, a left image 10a and a right image 10b, each of which has a rectangular element 20a, 20b and a circular element 30a, 30b, are added to obtain a disparity map 10c using SAD as a disparity estimation method through a local method.

The left image 10a is composed of a first rectangular element 20a and a first circular element 30a in a non-texture region, and the right image 10b is composed of a second rectangular element 20b and a second circular element 30b in a non-texture region.

Here, the left image 10a is set as a reference image, and a certain block region is set around a reference pixel of the reference image. Then, the SAD disparity estimation method is performed to find a region in the right image most similar to the certain block region set around the left image using light and shade information.

While it is possible to find substantially similar regions in the non-texture regions of the left image 10a and the right image 10b, it does not provide the precise disparity.

As a result, the stereo matching using the local method generates distortion due to false matching of a third rectangular element 20c and a third circular element 30c in the non-texture region of the disparity map 10c.

SUMMARY OF THE INVENTION

Aspects of embodiments of the present invention are directed toward a stereo matching system and a stereo matching method using (or utilizing) the same capable of adding Sum of Edge Differences (SED) as a disparity estimation method utilizing edge information to a disparity estimation method utilizing a local method to correct false matching in a non-texture region. Other aspects of embodiments of the present invention are directed toward a stereo matching system and a stereo matching method using (or utilizing) the same capable of synthesizing a disparity estimation method by a local method and SED as a disparity estimation method utilizing edge information.

An embodiment of the present invention provides a stereo matching system. The stereo matching system includes: a stereo image obtaining part adapted to obtain a left image and a right image; a first disparity estimation part adapted to estimate disparity of the left image and the right image utilizing a local method; an edge information obtaining part adapted to obtain edge information from the left image and the right image; a second disparity estimation part adapted to estimate disparity through Sum of Edge Differences (SED) utilizing the edge information; and a disparity synthesizing part adapted to synthesize disparities of the first disparity estimation part and the second disparity estimation part to produce a disparity map.

In one embodiment, the first disparity estimation part utilizes Sum of Absolute Differences (SAD) to estimate the disparity of the left image and the right image.

In one embodiment, the disparity synthesizing part synthesizes the SAD and the SED to produce the disparity map.

Another embodiment of the present invention provides a stereo matching method that includes: obtaining a left image and a right image; estimating disparity of the left image and the right image utilizing a local method; obtaining edge information from the left image and the right image; estimating disparity through Sum of Edge Differences (SED) utilizing the edge information; and synthesizing disparities of the estimating of the disparity of the left image and the right image utilizing the local method and the estimating of the disparity through the SED utilizing the edge information to produce a disparity map.

In one embodiment, the estimating of the disparity of the left image and the right image utilizing the local method includes utilizing Sum of Absolute Differences (SAD) to estimate the disparity of the right image and the left image.

In one embodiment, the synthesizing of the disparities includes synthesizing the SAD and the SED to produce the disparity map.

In one embodiment, the SED satisfies the following:

$$SED(x, y, z) = \sum_{V} |DL(x, y, V) - DR(x+d, y, V)|,$$

wherein in DL(x,y,V), x and y represent coordinate information of a reference pixel of a left image, V represents a first direction from the reference pixel to an edge of the left image, wherein DL(x,y,V) represents a distance from the reference pixel of the left image to the edge of the left image along the first direction, wherein in DR(x+d,y,V), (x+d,y) represents coordinate information of a reference pixel of the right image moved by a disparity d in an X-axis direction corresponding to the reference pixel of the left image, and V represents the first direction from the reference pixel of the right image to an edge of the right image corresponding to the edge of the left image, and wherein DR(x+d,y,V) represents a distance from the reference pixel of the right image to the edge of the right image along the first direction. The first direction may be a single direction or a plurality of directions.

In one embodiment, the synthesizing of the disparities satisfies the following:

$$C(d) = C_{local}(d) + \lambda C_{sed}(d),$$

wherein $C_{local}(d)$ is a parameter representing the disparity estimation method utilizing the local method, $C_{sed}(d)$ is a parameter representing the SED as the disparity estimation method utilizing the edge information, and λ is a constant representing importance of the SED. In one embodiment, the stereo matching method further includes reducing the C(d) to a minimum value.

In one embodiment, the estimating of the disparity of the left image and the right image utilizing the local method is performed concurrently with the obtaining of the edge information from the left image and the right image and the estimating of the disparity through the SED utilizing the edge information or the estimating of the disparity of the left image and the right image utilizing the local method is performed after the obtaining of the edge information from the left image and the right image and the estimating of the disparity through the SED utilizing the edge information.

BRIEF DESCRIPTION OF THE DRAWINGS

The accompanying drawings, together with the specification, illustrate exemplary embodiments of the present invention, and, together with the description, serve to explain the principles of the present invention.

FIG. 4 is a schematic view for explaining a Sum of Edge Differences (SED) disparity estimation method utilizing edge information in accordance with an exemplary embodiment of the present invention;

DETAILED DESCRIPTION

Figure 1:
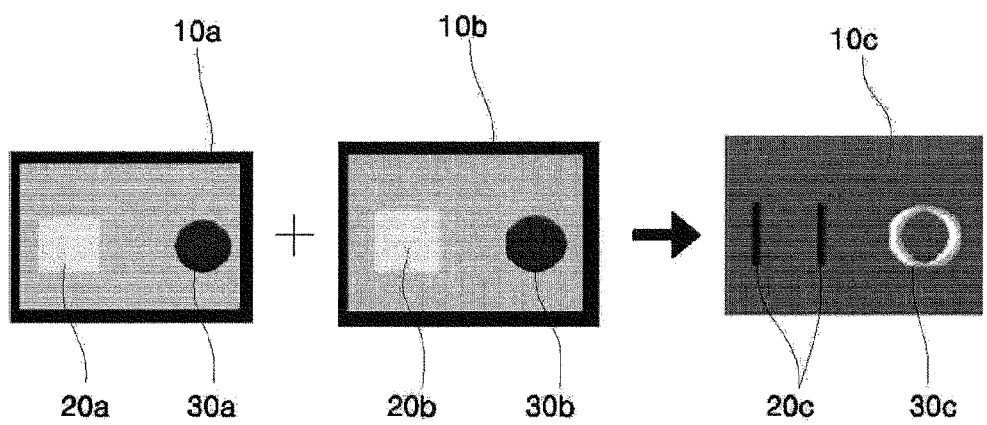
FIG. 1 is a schematic view for explaining stereo matching in a non-texture region.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

In order to reduce false matching in a non-texture region caused by a local method, stereo matching in accordance with an embodiment of the present invention additionally performs a Sum of Edge Differences (SED) disparity estimation method utilizing edge information.

Figure 2:
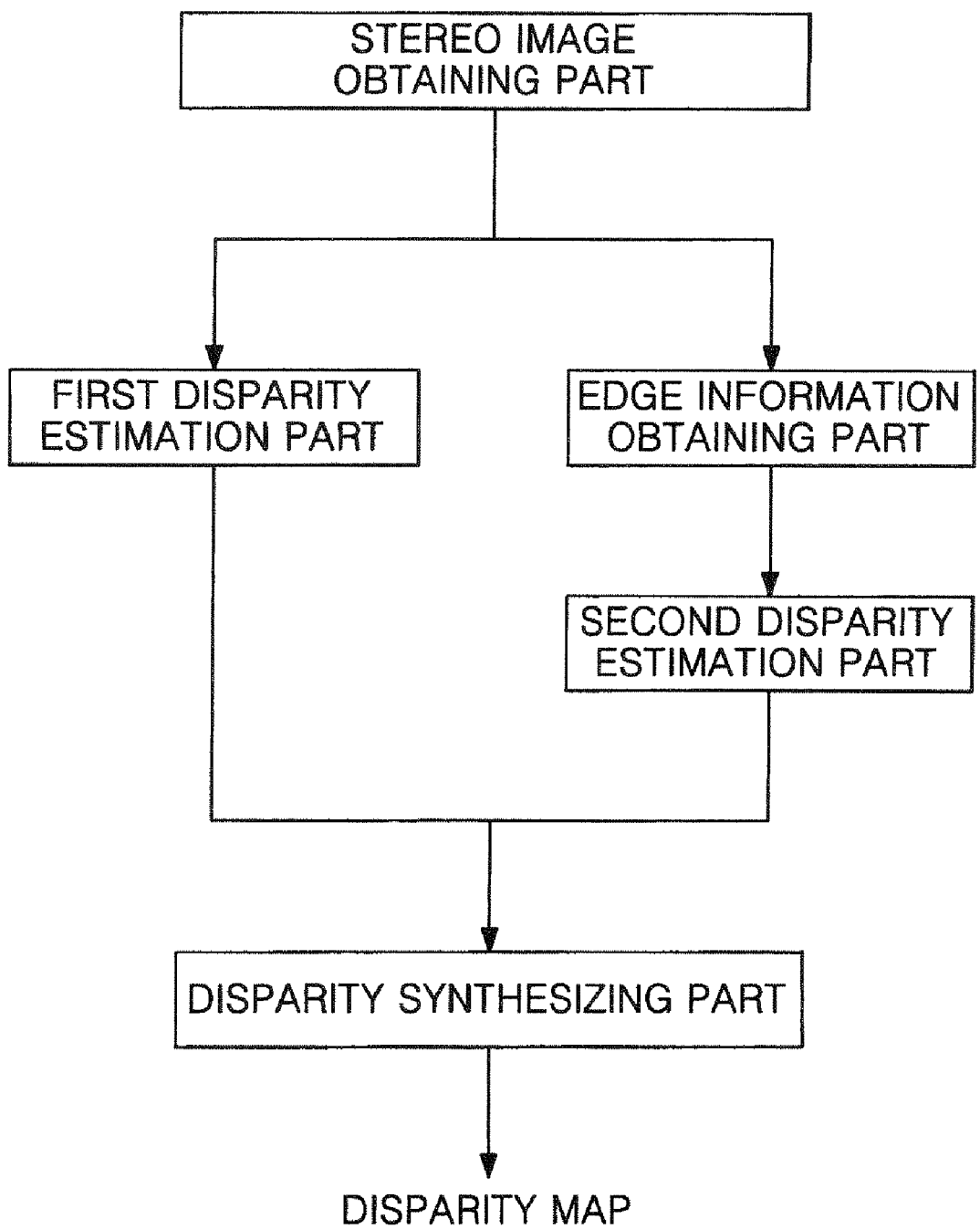
FIG. 2 is a block diagram of a stereo matching system in accordance with an exemplary embodiment of the present invention.

FIG. 2 is a block diagram of a stereo matching system in accordance with an exemplary embodiment of the present invention.

The stereo matching system includes a stereo image obtaining part, a first disparity estimation part, an edge information obtaining part, a second disparity estimation part, and a disparity synthesizing part, which are described in more detail below.

First, the stereo image obtaining part performs a first step of obtaining a left image and a right image.

Then, the first disparity estimation part estimates disparity utilizing a local method to set a certain block region around a reference pixel utilizing the left image obtained by the image obtaining part as a reference image.

Next, a second step of finding a region of the right image most similar to the certain block region set by the left image utilizing light and shade information is performed.

At this time, the local method may be at least one method selected from a Sum of Squared Differences (SSD) method for obtaining a correlation between blocks of certain regions of the left and right images using (or utilizing) light and shade information and for summing squared differences, a Sum of Absolute Differences (SAD) method for obtaining a correlation between the blocks and for summing absolute differences, and a normalized cross coefficient method using (or utilizing) a correlation between pixels method.

In one embodiment, the SAD method is used as a simple calculation method.

Next, the edge information obtaining part performs a third step of obtaining edge information from the left image and the right image obtained by the stereo image obtaining part utilizing a suitable edge detection method.

Next, the second disparity estimation part estimates disparity through the SED utilizing the edge information of the left image and the right image obtained by the third step. More specifically, first, a distance from a reference pixel of the left image as the reference image to an edge in a certain direction is calculated. Then, a distance from a reference pixel of the right image to an edge in a certain direction is calculated.

A fourth step of obtaining a difference between the distances from the reference pixels to the edges obtained from the left image and the right image and finding a region having a minimum sum is performed.

Next, the disparity synthesizing part performs a fifth step of synthesizing the disparities obtained by the first disparity estimation part and the second disparity estimation part.

As such, in view of the foregoing, false stereo matching generated in the non-texture region can be corrected to obtain a good disparity map having improved precision.

Here, the second step may be performed substantially simultaneously (or concurrently) with the third step and the fourth step, or may be performed after the third step and the fourth step.

Figure 3:
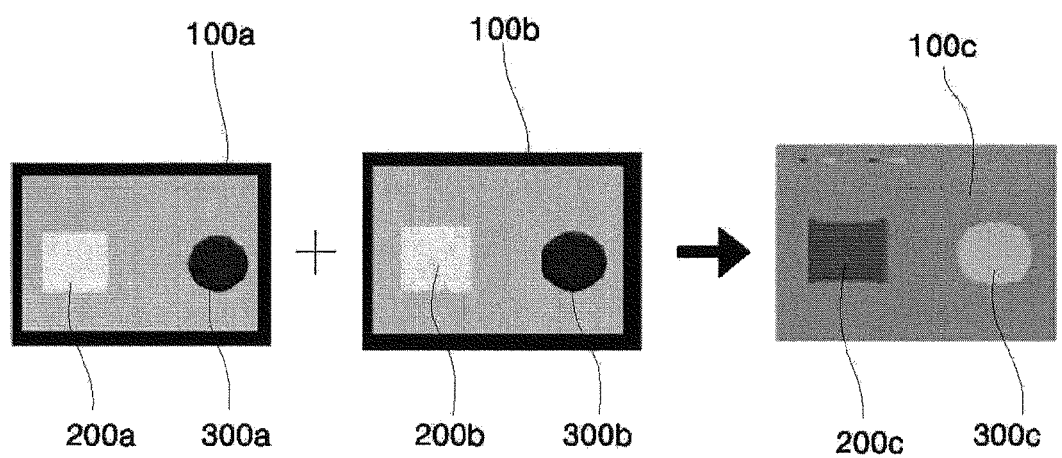
FIG. 3 is a schematic view for explaining stereo matching in a non-texture region in accordance with an exemplary embodiment of the present invention.

Stereo matching in accordance with embodiments of the present invention will be more apparent from the following description with reference to FIGS. 3 and 4.

FIG. 3 is a view for explaining stereo matching in a non-texture region in accordance with an exemplary embodiment of the present invention.

Referring to FIG. 3, a left image 100a and a right image 100b, each of which is composed of a rectangular element 200a, 200b and a circular element 300a, 300b, are added to obtain a disparity map 100c through the disparity estimation method that includes the SAD method utilizing a local method and the SED method utilizing edge information.

The left image 100a is composed of a first rectangular element 200a and a first circular element 300a in a non-texture region, and the right image 100b is composed of a second rectangular element 200b and a second circular element 300b in a non-texture region.

Here, the SAD method sets a certain block region around a reference block of the left image 100a as the reference image utilizing light and shade information.

Then, a region of the right image 100b most similar to the certain block region of the left image 100a is found.

Next, the SED method calculates a distance from the reference pixels of the left image 100a and the right image 100b to edges in certain directions utilizing edge information.

Then, distance differences from the reference pixels of the left image 100a and the right image 100b to the edges are added to find a most similar region.

Next, disparities obtained by the SAD method and the SED method are synthesized to obtain a disparity map 100c.

Therefore, the SED method utilizing edge information is added to the SAD method to obtain a better disparity map, such as a third rectangular element 200c and a third circular element 300c of the disparity map 100c of FIG. 3, in comparison with the third rectangular element 20c and the third circular element 30c of the disparity map 10c of FIG. 1.

As a result, the stereo matching method satisfies the following Formula 1 utilizing a disparity d:

$$C(d)=C_{local}(d)+\lambda C_{sed}(d), \quad \text{Formula 1}$$

wherein $C_{local}(d)$ is a parameter representing a disparity estimation method utilizing a local method, $C_{sed}(d)$ is a parameter representing the SED method as the disparity estimation method utilizing edge information, and $\lambda$ is a constant representing importance (or weight) of the SED method (to C(d)).

When C(d) has a minimum value, it is possible to obtain disparity having the highest stereo matching precision.

The SED method will be described in more detail by the following description with reference to FIG. 4.

FIG. 4 is a view for explaining a Sum of Edge Differences (SED) disparity estimation method utilizing edge information in accordance with an exemplary embodiment of the present invention.

Referring to FIG. 4, the SED is a disparity estimation method utilizing distance differences from the reference pixels of the left and right images to edges in certain directions and sums thereof. The distance from the reference pixels to the edges are represented as arrows.

First, distances from a first block 400a of a certain region of a left image 410a as a reference image to edges are obtained in upper, lower, left and right directions.

Next, the right image 420 may be a first right image 410b or a second right image 410c. Here, distances to edges from a second reference pixel 430b of a second block 400b and from a third reference pixel 430c of a third block 400c, each corresponding to the first block 400a, are obtained in upper, lower, left and right directions.

Differences between distances from the reference pixel 430a of the left image 410a to the edges and distances from the second reference pixel 430b of the first right image 410b to the edges are calculated.

Then, differences between distances from the reference pixel 430a of the left image 410a to the edges and distances from the third reference pixel 430c of the second right image 410c to the edges are calculated, and the sums of the differences are calculated.

Then, the third block 400c of the second right image 410c having the minimum sum is selected as a region most similar to the first block 400a of the left image 410a.

Therefore, it is possible to discriminate the first right image 410b and the second right image 410c, which are difficult to discriminate using the local method. The SED disparity estimation method satisfies the following Formula 2:

$$SED(x, y, z) = \sum_V |DL(x, y, V) - DR(x+d, y, V)|. \quad \text{Formula 2}$$

In DL(x,y,V), x and y represent coordinate information of a reference pixel of a left image, and V represents a certain direction from the reference pixel to the edges.

Therefore, DL(x,y,V) represents a distance from the reference pixel (x,y) of the left image to the edge in the certain V direction.

Then, in DR(x+d,y,V), (x+d,y) represents coordinate information of the reference pixel of the right image moved by disparity d in an X-axis direction corresponding to the reference pixel of the left image. V represents a certain direction from the reference pixel of the right image to the edge.

Therefore, DR(x+d,y,V) represents a distance from the reference pixel (x+d,y) of the right image to the edge in the certain V direction.

Then, SED(x,y,d) becomes a sum value of differences between the distance from the reference pixel of the left image to the edge in the V direction and the distance from the reference pixel (x+d,y) to the edge in the V direction.

When the sum is minimized, it is possible to obtain the right image most similar to the left image as the reference image.

In addition, V, representing a certain direction between the reference pixel and the edge, may be a single direction or a plurality of directions between the reference pixel and the edge. For example, two (left and right) or four (left, right, upper and lower) V directions may be implemented.

The above objects, technical constitution, and effects of the present invention will be described in more detail by the following exemplary embodiments with reference to the accompanying drawings.

Exemplary Embodiment 1

Figure 5A:
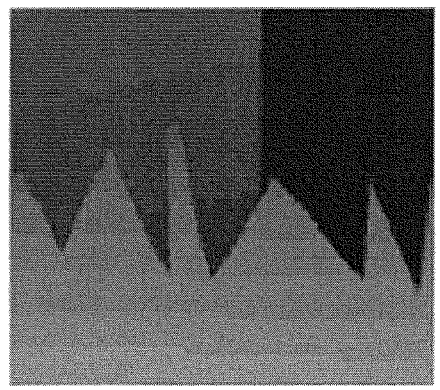
FIGS. 5A, 5B, and 5C are photographs showing a first exemplary embodiment in accordance with the present invention.
Figure 5B:
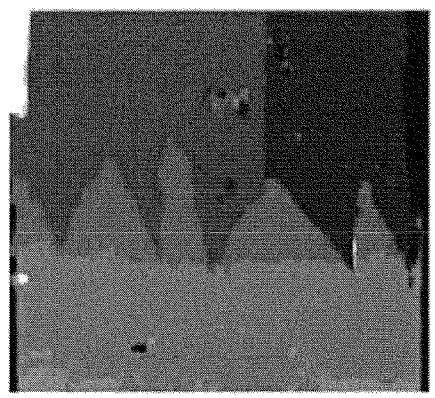
Figure 5C:

FIGS. 5A to 5C are photographs showing a first exemplary embodiment in accordance with the present invention.

First, FIG. 5A is a disparity map representing actual disparity of an image. FIG. 5B is a disparity map obtained by the SAD disparity estimation method utilizing a local method. FIG. 5C is a disparity map of the first exemplary embodiment in which the SED disparity estimation method utilizing edge information is added to the SAD method.

Here, the photograph of FIG. 5C can be obtained by the stereo matching system including the stereo image obtaining part, the first disparity estimation part, the edge information obtaining part, the second disparity estimation part, and the disparity synthesizing part, which have been described with reference to FIG. 2. Operation of the stereo matching system will be described below.

First, the stereo image obtaining part performs a first step of obtaining a left image and a right image.

Next, the first disparity estimation part estimates disparity utilizing SAD as a local method, and sets a certain block region around a reference pixel utilizing light and shade information from the left image obtained by the image obtaining part as a reference image.

Then, a second step of finding a region of the right image most similar to the certain block region set by the left image and estimating disparity is performed. FIG. 5B is a disparity map obtained by the second step utilizing the SAD method.

Next, the edge information obtaining part performs a third step of obtaining edge information from each of the left image and the right image, obtained by the stereo image obtaining part utilizing a suitable edge detection method.

Next, the second disparity estimation part estimates disparity by the SED method utilizing the edge information of the left image and the right image obtained by the second step.

More specifically, a distance from a reference pixel of the left image as the reference image to an edge in a certain direction is calculated.

Then, a distance from a reference pixel of the right image to an edge in a certain direction is calculated.

Next, a fourth step of calculating a difference between distances from the reference pixels obtained from the left image and the right image to the edges and finding a region having a minimum sum is performed, according to Formula 2 of the above description.

Next, the disparity synthesizing part performs a fifth step of synthesizing the disparity obtained by the first disparity estimation part and the disparity obtained by the second disparity estimation part to produce a disparity map, according to Formula 1 of the above description.

Therefore, it is possible to correct false stereo matching generated from the non-texture region, thereby obtaining a disparity map with improved precision as shown in FIG. 5C.

Here, it will be appreciated that FIG. 5C is similar to FIG. 5A by representing a more actual disparity, as compared to the map shown in FIG. 5B. This difference in precision will be described in more detail by the following description with reference to FIG. 6.

Figure 6:
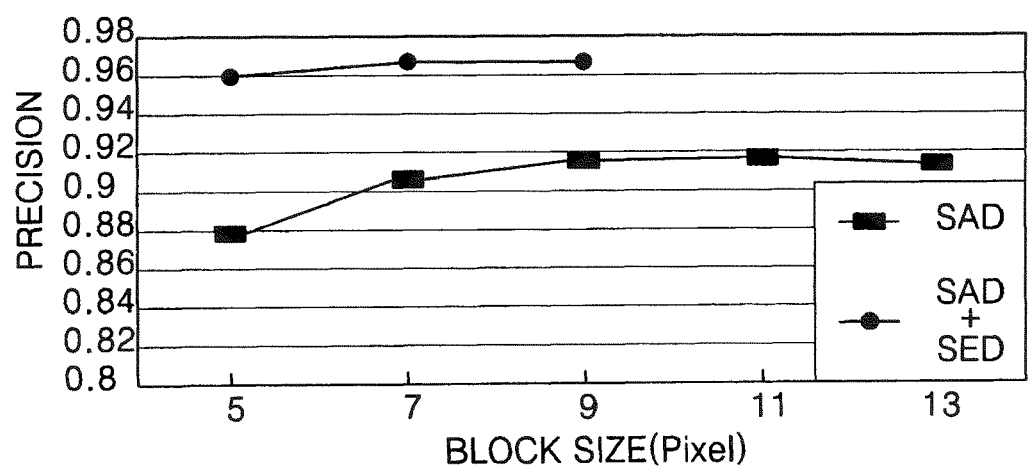
FIG. 6 is a graph showing precision according to block size during stereo matching of the first exemplary embodiment.

FIG. 6 is a graph showing precision according to block size during stereo matching of the first exemplary embodiment in accordance with the present invention.

Referring to FIG. 6, the precision is represented by a ratio of the number of pixels existing within a range of ±1 pixels during stereo matching, using FIG. 5A as a reference representing actual disparity of the image and the number of pixels of the entire image.

Here, the SAD method is a disparity estimation method by a local method, and is represented by FIG. 5B.

In addition, the SAD+SED method is a disparity estimation method in which the SED disparity estimation method utilizing edge information is added to the SAD method, and is represented by FIG. 5C.

Also, the SAD+SED method satisfies Formula 1 described in the above description, and represents the precision depending on a block size when $\lambda=0.5$.

FIG. 6 shows that precision of the disparity map of FIG. 5C in which the SAD method and the SED method are synthesized is higher than the precision of the disparity map of FIG. 5B using the SAD method only.

Exemplary Embodiment 2

Figure 7A:
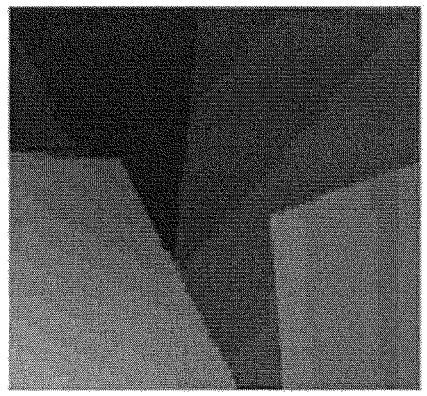
FIGS. 7A, 7B, and 7C are photographs showing a second exemplary embodiment in accordance with the present invention.
Figure 7B:
Figure 7C:
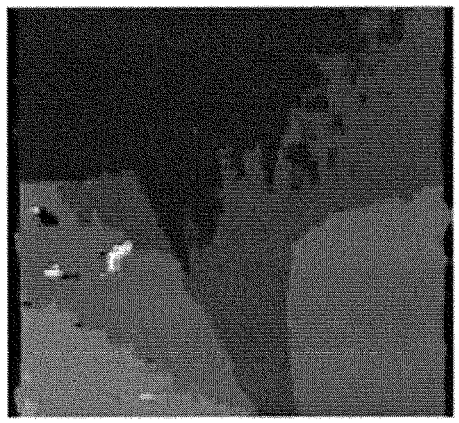

FIGS. 7A to 7C are photographs showing a second exemplary embodiment in accordance with the present invention.

First, FIG. 7A is a disparity map representing actual disparity of an image.

FIG. 7B is a disparity map obtained by an SAD disparity estimation method using a local method.

FIG. 7C is a disparity map in which an SED disparity estimation method using edge information is added to the SAD method.

Here, the photograph of FIG. 7C can be obtained by the stereo matching system including the stereo image obtaining part, the first disparity estimation part, the edge information obtaining part, the second disparity estimation part, and the disparity synthesizing part, which have been described with reference to FIG. 2. Operation of the stereo matching system will be described below.

First, the stereo image obtaining part performs a first step of obtaining a left image and a right image.

Next, the first disparity estimation part estimates disparity using SAD as a local method, and sets a certain block region around a reference pixel as a reference image, utilizing light and shade information from the left image obtained by the image obtaining part.

Then, a second step of finding a region of the right image most similar to the certain block region set by the left image and estimating disparity is performed.

FIG. 7B is a disparity map obtained by the second step utilizing the SAD method.

Next, the edge information obtaining part performs a third step of obtaining edge information from each of the left image and the right image, obtained by the stereo image obtaining part utilizing a suitable edge detection method.

Next, the second disparity estimation part estimates disparity by the SED method utilizing the edge information of the left image and the right image obtained by the second step.

First, a distance from a reference pixel of the left image as the reference image to an edge in a certain direction is calculated.

Then, a distance from a reference pixel of the right image to an edge in a certain direction is calculated.

Next, a fourth step of calculating a difference between distances from the reference pixels obtained from the left image and the right image to the edges and finding a region having a minimum sum is performed, according to Formula 2 of the above description.

Next, the disparity synthesizing part performs a fifth step of synthesizing the disparity obtained by the first disparity estimation part and the disparity obtained by the second disparity estimation part, according to Formula 1 of the above description.

Therefore, it is possible to correct false stereo matching generated from the non-texture region, thereby obtaining a disparity map with improved precision, as shown in FIG. 7C.

Here, it will be appreciated that FIG. 7C is similar to FIG. 7A by representing a more actual disparity, as compared to the map shown in FIG. 7B. This difference in precision will be described in more detail by the following description with reference to FIG. 8.

Figure 8:
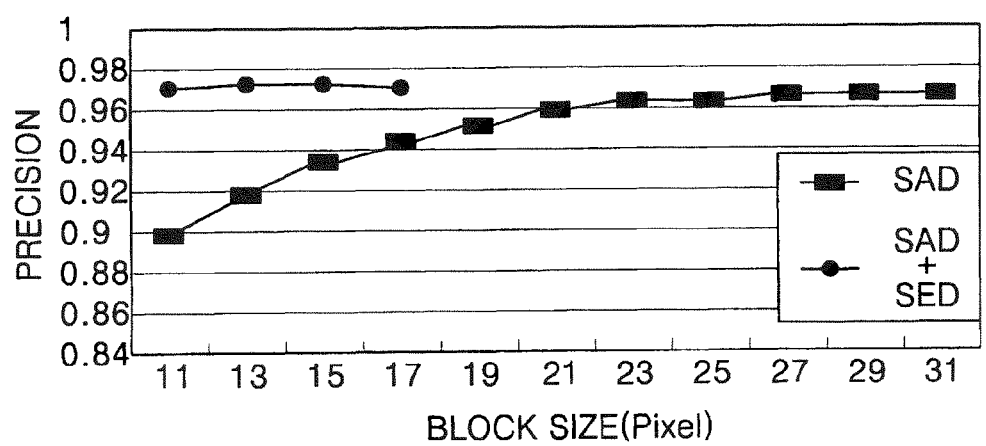
FIG. 8 is a graph showing precision according to block size during stereo matching of the second exemplary embodiment.

FIG. 8 is a graph showing precision according to block size during stereo matching of the second exemplary embodiment in accordance with the present invention.

Referring to FIG. 8, the precision is represented by a ratio of the number of pixels existing within a range of ±1 pixels during stereo matching, utilizing FIG. 7B as a reference representing actual disparity of the image and the number of pixels of the entire image.

Here, the SAD method is a disparity estimation method by a local method, and is represented by FIG. 7B.

In addition, the SAD+SED method is a disparity estimation method in which the SED disparity estimation method utilizing edge information is added to the SAD method, and is represented by FIG. 7C.

Also, the SAD+SED method satisfies Formula 1 described in the above description, and represents precision depending on a block size when λ=0.5.

FIG. 8 shows that precision of the disparity map of FIG. 7C in which the SAD method and the SED method are synthesized is higher than the precision of the disparity map of FIG. 7B utilizing the SAD method only.

Figure 9:
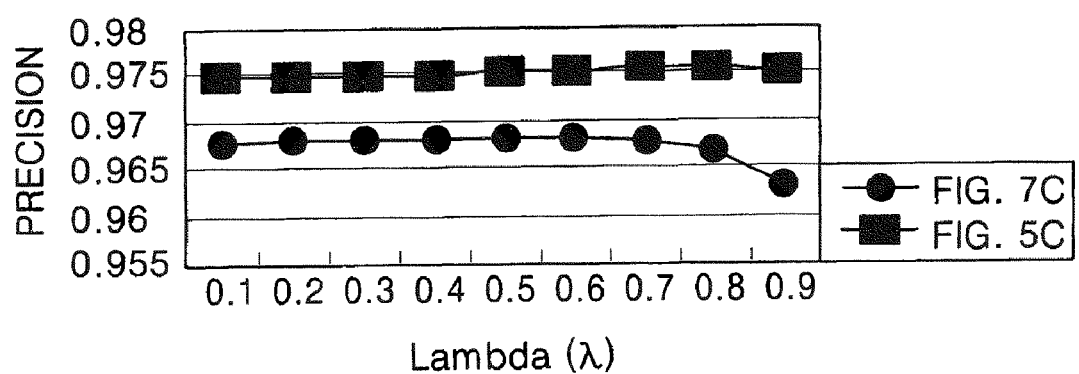
FIG. 9 is a graph showing stereo matching precision according to a parameter λ.

FIG. 9 is a graph showing stereo matching precision according to a parameter λ.

Referring to FIG. 9, the precision of FIG. 5C, depending on λ, is substantially uniform. However, the precision of FIG. 7C decreases as λ increases.

While the first and second exemplary embodiments have been described in the case of λ=0.5, the precision is affected by the parameter λ.

Since Formula 1 of the above description represents the importance of the SED method as described above, it is possible to optimize the parameter λ to perform better stereo matching.

Therefore, by utilizing edge information, the stereo matching system and the stereo matching method using (or utilizing) the same can correct for false matching in a non-texture region generated during stereo matching that utilizes a local method only, thereby enabling good stereo matching.

As can be seen from the foregoing, while the stereo matching in accordance with exemplary embodiments of the present invention has been described with reference to the left image, the stereo matching may be performed with reference to the right image.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A stereo matching system comprising:
a stereo image obtaining part adapted to obtain a left image and a right image;
a first disparity estimation part adapted to estimate disparity of the left image and the right image utilizing a local method;
an edge information obtaining part adapted to obtain edge information from the left image and the right image;
a second disparity estimation part adapted to estimate disparity through Sum of Edge Differences (SED) utilizing the edge information; and
a disparity synthesizing part adapted to synthesize disparities of the first disparity estimation part and the second disparity estimation part to produce a disparity map.

2. The stereo matching system according to claim 1, wherein the first disparity estimation part utilizes Sum of Absolute Differences (SAD) to estimate the disparity of the left image and the right image.

3. The stereo matching system according to claim 1, wherein the disparity synthesizing part synthesizes Sum of Absolute Differences (SAD) and the SED to produce the disparity map.

4. A stereo matching method comprising:
obtaining a left image and a right image;
estimating disparity of the left image and the right image utilizing a local method;
obtaining edge information from the left image and the right image;
estimating disparity through Sum of Edge Differences (SED) utilizing the edge information; and
synthesizing disparities of the estimating of the disparity of the left image and the right image utilizing the local method and the estimating of the disparity through the SED utilizing the edge information to produce a disparity map.

5. The stereo matching method according to claim 4, wherein the estimating of the disparity of the left image and the right image utilizing the local method comprises utilizing Sum of Absolute Differences (SAD) to estimate the disparity of the right image and the left image.

6. The stereo matching method according to claim 4, wherein the synthesizing of the disparities comprises synthesizing Sum of Absolute Differences (SAD) and the SED to produce the disparity map.

7. The stereo matching method according to claim 4, wherein the SED satisfies the following:

$$SED(x, y, z) = \sum_{V} |DL(x, y, V) - DR(x+d, y, V)|,$$

wherein, in DL(x,y,V), x and y represent coordinate information of a reference pixel of a left image, V represents a first direction from the reference pixel to an edge of the left image,
wherein DL(x,y,V) represents a distance from the reference pixel of the left image to the edge of the left image along the first direction,
wherein, in DR(x+d,y,V), x+d and y represent coordinate information of a reference pixel of the right image moved by a disparity d in an X-axis direction corresponding to the reference pixel of the left image, and V represents the first direction from the reference pixel of the right image to an edge of the right image corresponding to the edge of the left image, and
wherein DR(x+d,y,V) represents a distance from the reference pixel of the right image to the edge of the right image along the first direction.

8. The stereo matching method according to claim 7, wherein the first direction is a single direction or a plurality of directions.

9. The stereo matching method according to claim 4, wherein the synthesizing of the disparities satisfies the following:

$$C(d) = C_{local}(d) + \lambda C_{sed}(d),$$

wherein $C_{local}(d)$ is a parameter representing the disparity estimation method utilizing the local method, $C_{sed}(d)$ is a parameter representing the SED as the disparity estimation method utilizing the edge information, and λ is a constant representing importance of the SED.

10. The stereo matching method according to claim 9, further comprising reducing the C(d) to a minimum value.

11. The stereo matching method according to claim 4, wherein the estimating of the disparity of the left image and the right image utilizing the local method is performed concurrently with the obtaining of the edge information from the left image and the right image and the estimating of the disparity through the SED utilizing the edge information.

12. The stereo matching method according to claim 4, wherein the estimating of the disparity of the left image and the right image utilizing the local method is performed after the obtaining of the edge information from the left image and the right image and the estimating of the disparity through the SED utilizing the edge information.

13. A stereo matching system comprising:
first means for obtaining a left image and a right image;
second means for estimating disparity of the left image and the right image utilizing a local method;
third means for obtaining edge information from the left image and the right image;
fourth means for estimating disparity through Sum of Edge Differences (SED) utilizing the edge information; and
fifth means for synthesizing disparities of the estimating of the disparity of the left image and the right image utilizing the local method and the estimating of the disparity through the SED utilizing the edge information to produce a disparity map.

14. The stereo matching system according to claim 13, wherein the second means utilizes Sum of Absolute Differences (SAD) to estimate the disparity of the left image and the right image.

15. The stereo matching system according to claim 13, wherein the fifth means synthesizes Sum of Absolute Differences (SAD) and the SED to produce the disparity map.

16. The stereo matching system according to claim 13, wherein the SED satisfies the following:

$$SED(x, y, z) = \sum_{V} |DL(x, y, V) - DR(x+d, y, V)|,$$

wherein, in DL(x,y,V), x and y represent coordinate information of a reference pixel of a left image, V represents a first direction from the reference pixel to an edge of the left image,
wherein DL(x,y,V) represents a distance from the reference pixel of the left image to the edge of the left image along the first direction,
wherein, in DR(x+d,y,V), x+d and y represent coordinate information of a reference pixel of the right image moved by a disparity d in an X-axis direction corresponding to the reference pixel of the left image, and V represents the first direction from the reference pixel of the right image to an edge of the right image corresponding to the edge of the left image, and
wherein DR(x+d,y,V) represents a distance from the reference pixel of the right image to the edge of the right image along the first direction.

17. The stereo matching system according to claim 16, wherein the first direction is a single direction or a plurality of directions.

18. The stereo matching system according to claim 13, wherein the synthesizing of the disparities:

$C(d)=C_{local}(d)+\lambda C_{sed}(d),$ wherein $C_{local}(d)$ is a parameter representing the second means utilizing the local method, $C_{sed}(d)$ is a parameter representing the SED as the fourth means utilizing the edge information, and λ is a constant representing importance of the SED.

19. The stereo matching system according to claim 18, further comprising means for reducing the C(d) to a minimum value.

20. The stereo matching system according to claim 13, further comprising means for performing the second means concurrently with or after the third means and the fourth means.

* * * * *